April 18, 1933.   F. M. POTTER   1,904,527
CABLE
Filed Feb. 4, 1928
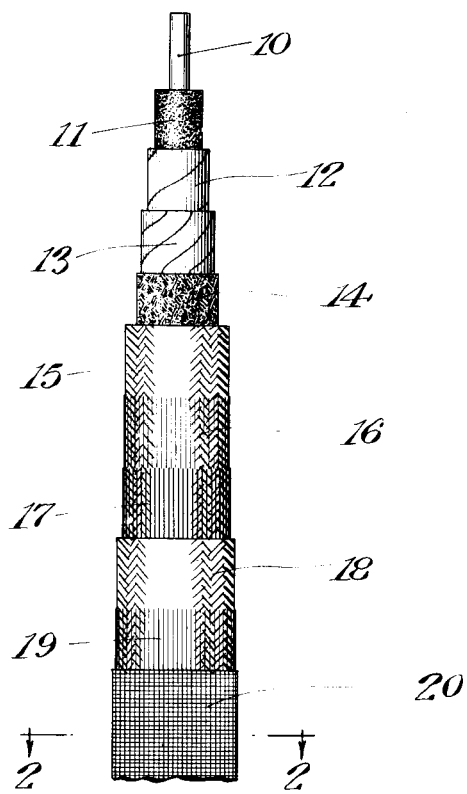
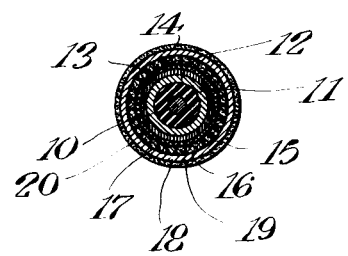
Inventor
Frank M. Potter
By his Attorneys
Emery, Booth, Janney & Varney Patented Apr. 18, 1933

1,904,527

UNITED STATES PATENT OFFICE

FRANK M. POTTER, OF ROME, NEW YORK, ASSIGNOR TO GENERAL CABLE CORPORATION, OF NEW YORK, N. Y., A CORPORATION OF NEW JERSEY

CABLE

Application filed February 4, 1928. Serial No. 251,767.

The present invention relates to insulated electric cables. The invention has been developed in connection with cables subjected to constant rubbing or chafing and accompanying moisture, as for example will be the case when the cable is placed among the limbs of trees, so will be discussed in this relation but with a full realization that it may have various other applications.

Among the objects of the invention are the provision of electrical conductors or cables which will have high dielectric strength; which will be extremely resistant to heat and weather, which will be highly resistant to moisture even after long periods of service; which will be mechanically tough to a high degree to resist constant chafing without exposing the metallic conductor; which will be inexpensive; and which in the enumerated and other respects will constitute a general advance in the art. Further objects of the invention will be apparent from the following description of the preferred embodiment thereof.

Cables which are exposed in parts to the direct heat of the sun and which in other parts are situated among the branches of trees where a state of dampness exists for long periods and where constant abrasion or chafing by tree branches occurs have heretofore given considerable trouble. Coverings of a tough fibre such as jute have been used with fair results to minimize the effects of chafing but the saturants or coatings applied to such wear resistant coverings have not been sufficiently penetrating to fill the fibrous armor, nor sufficiently non-hygroscopic to prevent the entry of moisture. Then after the cables have been in service for some time coatings of bituminous compounds or such as contain petroleum or asphalt pitch frequently used have become brittle and cracked to permit the entry of moisture in even greater quantities. The presence of moisture in the fibrous covering causes rotting of the same and subsequent ease of injury from abrasion. Due to improper saturation the fibrous coverings have wicked moisture toward low sections of the cables to cause accelerated deterioration at those points.

According to the present invention a compound is employed for saturating and coating fibrous coverings, which is not only highly impervious to the entry of moisture but which fills the pores of fibrous material to such an extent that "wicking" of moisture to low places is eliminated. Moreover since the compounds retains its fluidity or plastic consistency for unlimited periods of time it insures a long life for the cable in which it is used. Should the cable sheath crack or become punctured, the putty because it thus maintains its plastic state, tends to flow or migrate toward the rupture and heal the same.

Again, it has been customary to saturate the fibrous surface covering of cables with hard waxes to give the required permanent resistance to solar heat and the effects of weathering since soft waxes are soon beaten out of the cover by weather or are melted or disintegrated by heat and solar radiation and migrate to the lower side of the cables. But hard waxes cannot be made to thoroughly saturate the fibrous covering,—at best the covering will appear to be saturated when in reality it is not. According to the present invention soft waxes are applied to the cable and are retained by a tough waterproofing skin-like wrapper.

The accompanying drawing shows the preferred and illustrative form of the invention and therein:—

Fig. 1 is a plan view having the several sheaths of material progressively removed to show the interior construction; and Fig. 2 is a cross section on line 2—2 of Fig. 1.

In the drawing, the cable will be observed to comprise a metallic electrical conductor 10 provided with the usual vulcanized rubber sheath 11. Over this a wrapping 12 of rubber impregnated tape is placed, followed by a close spirally wound armor 13 of special fibrous material, the abutting joints of which are carefully sealed. Or, instead of the fibrous armor, the sisal braid described below may be placed at this point and the former placed in the position described for the latter. That is, the relative locations of the fibrous armor and the sisal braid may be reversed.

Upon the fibrous armor 13 is placed a thick coating 14 of heat and waterproof putty or caulking compound. This compound may be composed of a base of a fatty acid pitch such as stearin pitch and a mineral filler such as asbestine (magnesium silicate). The asbestine which is in a finely divided state is added to the pitch in the amount required to give the desired consistency which preferably, at normal atmospheric temperatures is about like glazing putty and at 300° F. about like cold molasses. The amount of asbestine added will vary with the consistency of the pitch but will be between 10% and 30% of the whole. If a putty of a higher viscosity is desired as for filling the valleys of large conductor cables, fibre asbestos may also be added with the asbestine as a filler. Other mineral fillers, such as alumina, ground quartz, mica or magnesium oxide may be substituted for the magnesium silicate if desired. The compound is extremely resistant to heat and oxidation since each individual substance is almost completely oxidized before being combined. Further, this oxidation and moisture-resistant putty will not become brittle in cold weather nor unduly soft in hot weather. Since the putty maintains its fluidity, it follows that it tends to flow or migrate toward and heal any bruise or rupture which may later be made to the completed cable.

Next a braid 15 of sisal cord is applied over the coating of caulking compound. Sisal cord has been selected for this because of its high resistance to damage from chafing or abrasion. This braid or sisal cord is saturated with a waterproofing material which may be composed of asphalt, montan wax and paraffin indicated at 16, and thereafter a coating similar to 16 but of a higher melting point wax denoted at 17 is applied. If desired a fibrous armor such as paper may be substituted for the sisal braid, or as described above, the positions of the sisal braid 15 and the fibrous armor 13 may be interchanged. A cotton braid 18 is fabricated over the finishing compound and this braid is thoroughly saturated with a soft wax compound (also similar to 16) indicated at 19.

Finally the completed cable is painted with a metallic oxide paint such as red iron oxide, litharge, alumina, magnesium oxide, etc., mixed with a specially prepared oxidizable oil which may include boiled linseed oil, boiled partially polymerized China-wood oil, stearic acid and zinc resinate. This oil paint, when dry, provides a tough waterproof skin 20 which is effectual to prevent migration of the soft wax beneath it. The paint is also opaque to ultra-violet rays, thereby affording the insulating material of the cable additional protection.

It will be evident from the above disclosure that all of the materials used in making up the insulating covering of the metallic conductor have been chosen both with regard to final qualities desired in the cable and also with regard to their individual qualities, each as respects its effect upon the other, to produce a covering which will be singularly adapted for the purposes for which it is intended.

Although only one embodiment of the invention has been shown and described herein it will be understood that the invention may be variously modified and embodied within the scope of the sub-joined claims.

What I claim is:

1. An article of manufacture comprising in combination, a metallic electrical conductor, a rubber sheath surrounding said conductor, a wrapping of rubberized tape over said sheath, a fibrous armor over said wrapping, a coating of oxidation-and moisture-resistant plastic compound over said armor, said compound containing stearin pitch and asbestine, a sisal cord braid over said plastic coating, a wax saturant for said braid, a pitch finishing compound over said saturated braid, a cotton braid over the finishing material, and a tough skin coating of iron oxide paint over the whole.

2. An article of manufacture comprising, in combination, a metallic conductor, and a covering therefor including a fabric jacket, different wax substances applied to said fabric jacket, an outer fabric jacket, a soft wax substance applied to said outer jacket, and a tough waterproofing paint over the whole.

3. An article of manufacture comprising in combination an insulated electrical conductor, a fibrous armor surrounding said insulated conductor, a coating of oxidation- and moisture-resistant plastic compound over said fibrous armor, a sisal cord braid over said plastic coating, a wax saturant over said braid and a protective cover surrounding the whole and including a tough skin coating of metallic oxide paint.

4. An article of manufacture comprising in combination an insulated electrical conductor, a fibrous armor surrounding said insulated conductor, a coating of plastic oxidation- and moisture-resistant compound over said armor, a braid surrounding said compound, a wax saturant for said braid and a tough outer skin of metallic oxide paint surrounding the whole.

5. An article of manufacture comprising in combination an insulated electrical conductor, a fibrous armor over said insulated conductor, a braid over said armor, a wax saturant over said braid, a finishing compound over said saturated braid, and a tough skin coating of metallic oxide paint surrounding the whole.

In testimony whereof, I have signed my name to this specification this 2nd day of February 1928.

FRANK M. POTTER.